Sept. 30, 1941.  A. R. HAVENER  2,257,379
WORK SUPPORT FOR RIVETING AND SIMILAR MACHINES
Filed May 10, 1939   5 Sheets-Sheet 1

Inventor.
Arthur R. Havener
by Wright Brown Quinby
& May
Attys.

Sept. 30, 1941.  A. R. HAVENER  2,257,379
WORK SUPPORT FOR RIVETING AND SIMILAR MACHINES
Filed May 10, 1939  5 Sheets-Sheet 3

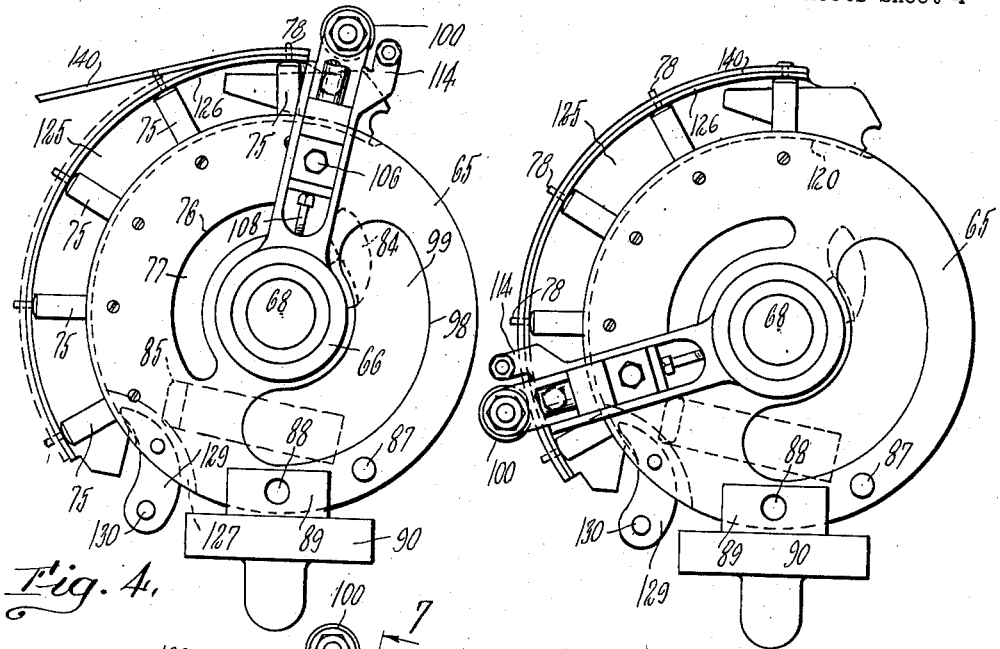
Fig. 4.
Fig. 5.
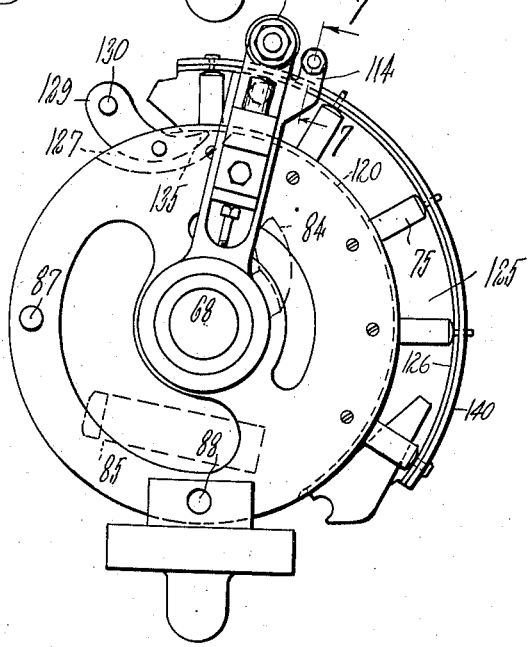
Fig. 6.
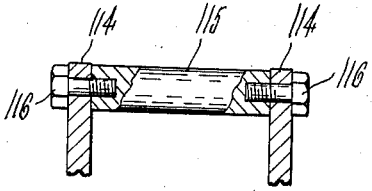
Fig. 7.

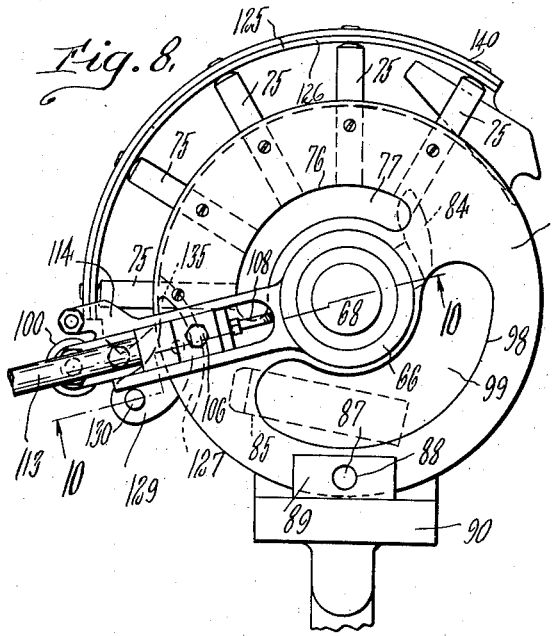

Patented Sept. 30, 1941

2,257,379

UNITED STATES PATENT OFFICE 2,257,379

WORK SUPPORT FOR RIVETING AND SIMILAR MACHINES

Arthur R. Havener, Wayland, Mass., assignor to Judson L. Thomson Manufacturing Company, Waltham, Mass., a corporation of Massachusetts Application May 10, 1939, Serial No. 272,868

11 Claims. (Cl. 218—0.5)

This invention relates to a work support more especially for a fastener setting machine and is exemplified herein in a riveting machine designed for fastening brake linings to brake bands, and, in that connection, the invention also relates to a method for applying and fastening the linings to the bands.

In the manufacture of braking apparatus for automobiles and other purposes, it is customary to provide the brake band with a lining or face of suitable frictional material fastened thereto by rivets suitably spaced. It is essential that the lining fit the brake band tightly throughout its length in order to secure proper functioning of the brakes in use. To attain this result, it has been customary to space the rivet holes in the lining nearer together than in the brake band, so that the lining must be stretched when applied to the band, in order to bring the rivet holes in the two parts in register for receiving the rivets.

Heretofore, it has been customary to fasten one end of the lining to one end of the band with a pair of rivets, and then by a suitable clamping mechanism to grip the other end of the lining and subject it to a strong pull to stretch it to bring the rivet holes in it in register with the rivet holes in the brake band. While the lining is so stretched, its free end is fastened to the band by a pair of rivets placed close to the gripping means, after which said means is released and the remaining portion of the lining is fastened by additional rivets.

In carrying out this method on a conveyor system at the present time, a girl operator fastens the end of the lining to the brake band with a pair of rivets; a man operator then applies the clamping device, stretches the lining, fastens it to the band adjacent the clamp and disconnects the clamp, and a girl operator completes the work by setting the remaining rivets. The operators work in teams of nine, two girls for the first step, five men for the clamping and stretching operation, and two girls for the setting of the remaining rivets. This calls for three separate handlings of the work.

This method is open to several serious objections. It results in loss of material, is slow, cumbersome, expensive, and inefficient. The use of gripping means for stretching the lining frequently fractures or tears it, requiring a new lining to be substituted and involving a loss of material and labor. This is of such frequent occurrence as to materially increase the cost of the operation. The application of the gripping mechanism to the linings is cumbersome and slows down the operation, and this method of stretching does not always produce the tight fit between the lining and the brake band which is required for proper braking. As a whole, the method is expensive and unsatisfactory in results.

The principal object of my invention is the provision in a riveting or similar machine, of a work support adapted for supporting work of curved form and adapted to be rocked or rotated into different positions for fastening two or more pieces of work together at different points.

A more specific object of the invention is the provision of a work support which, when incorporated in a riveting machine, adapts the machine for fastening linings to brake bands in an efficient and rapid manner, necessitating one handling only of the work.

Yet another object of the invention is the provision of a work support which will insure a close, tight fit between the lining and the brake band and yet eliminate all fracturing or tearing of the lining in its application to the band.

A further object is the provision of a machine which may be operated by unskilled labor, thereby reducing the labor cost.

A further object of the invention is the provision of a method of fastening the lining to the brake band which is rapid and avoids injury to the lining, and yet provides a perfect fit between the lining and the brake band.

Other and additional objects of the invention will be pointed out and described hereinafter.

My invention provides in a riveting machine a work support adapted for supporting work of curved form, such as a brake band, and which is adapted to be rocked or rotated and locked in various positions for riveting portions of the work together at different points. The invention also provides means for rolling under pressure a lining to a brake band to bring about a tight fit between the two parts.

In the preferred embodiment of the invention, the work support is in the form of a turret mounted for rotation in a vertical plane and having peripheral means for supporting the work in riveting position, and means for locking the turret in loading and various riveting positions.

For rolling a lining onto the brake band after it has been riveted thereto at one end, the preferred form of means consists of a roll so mounted as to adapt it to be rolled over the peripheral face of the turret to compress the lining to the band and to hold it while its other end is being riveted to the band. The roll is preferably adjustable in relation to the peripheral face of the turret to vary the amount of pressure exerted upon the lining. The roll may also be frictionally mounted so that force is required to rotate it, and the frictional means may be adjustable to vary the rotative force. The use of frictional means in the mounting of the roll produces a dragging effect when it is rolled over a lining, for instance, which tends to stretch the lining and thereby effect a closer contact between it and the brake band.

My invention further includes a method for applying and fastening a lining to a brake band consisting in fastening one end of a lining to one end of the brake band and then rolling the lining under pressure from its fastened end to its other end, and finally fastening said latter end to the band while the lining is held by the roll. In one phase of it, the method may include the rolling of the lining under a dragging pressure for stretching the lining onto the band.

In the accompanying drawings showing one embodiment of my invention,

Figure 2a is a detail section on line 2a—2a of Figure 2.

Figure 4 is a front elevation of the work support with the parts in position for riveting one end of the lining to the brake band, a brake band and lining being shown in position for the first riveting step.

Figure 5 is a similar view, showing the position of the parts after the brake lining has been rolled.

Figure 6 is a similar view, showing the position of the various parts after the turret has been turned into position for riveting the other end of the lining to the brake band.

Figure 7 is a detail section on line 7—7 of Figure 6.

Figure 8 is a front elevation of the work support approaching its position for ejecting a brake band after the lining has been fastened thereto, said ejecting means being shown in normal position.

Figure 9 is a similar view, showing the position of the parts after the ejecting means has been operated to disengage the work from the work support.

Figure 10 is a sectional view on line 10—10 in Figure 8.

Figure 1:
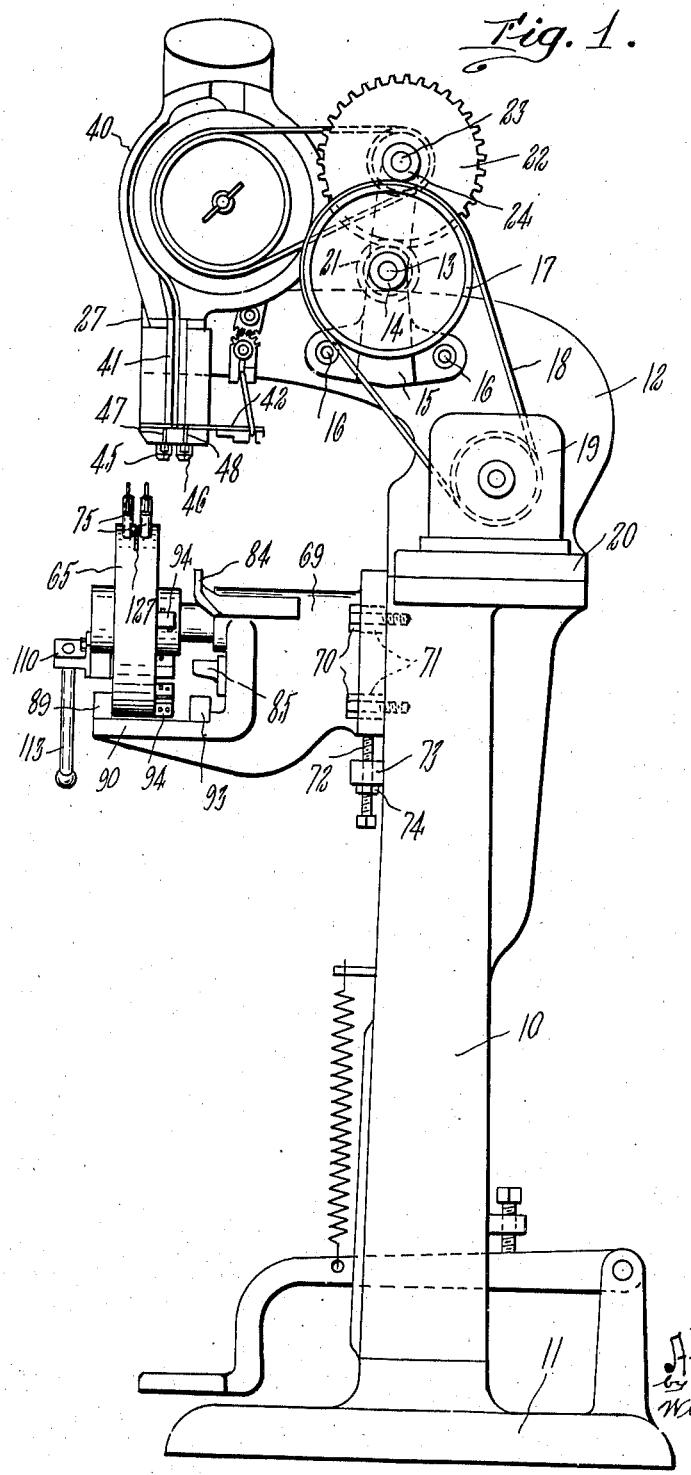
Figure 1 is a side elevation of a duplex riveting machine, provided with a work support constructed and adapted to be operated in accordance with my invention.

My invention may be applied to any suitable form of riveting or similar machine, but in the exemplification illustrated in the drawings, it is shown as applied to a riveting machine adapted for fastening linings to brake bands. The riveting machine shown is of the type illustrated in United States Letters Patent No. 1,698,922, issued on January 15, 1929, to A. D. Rhodes, provided with a duplex riveting mechanism.

Figure 2:
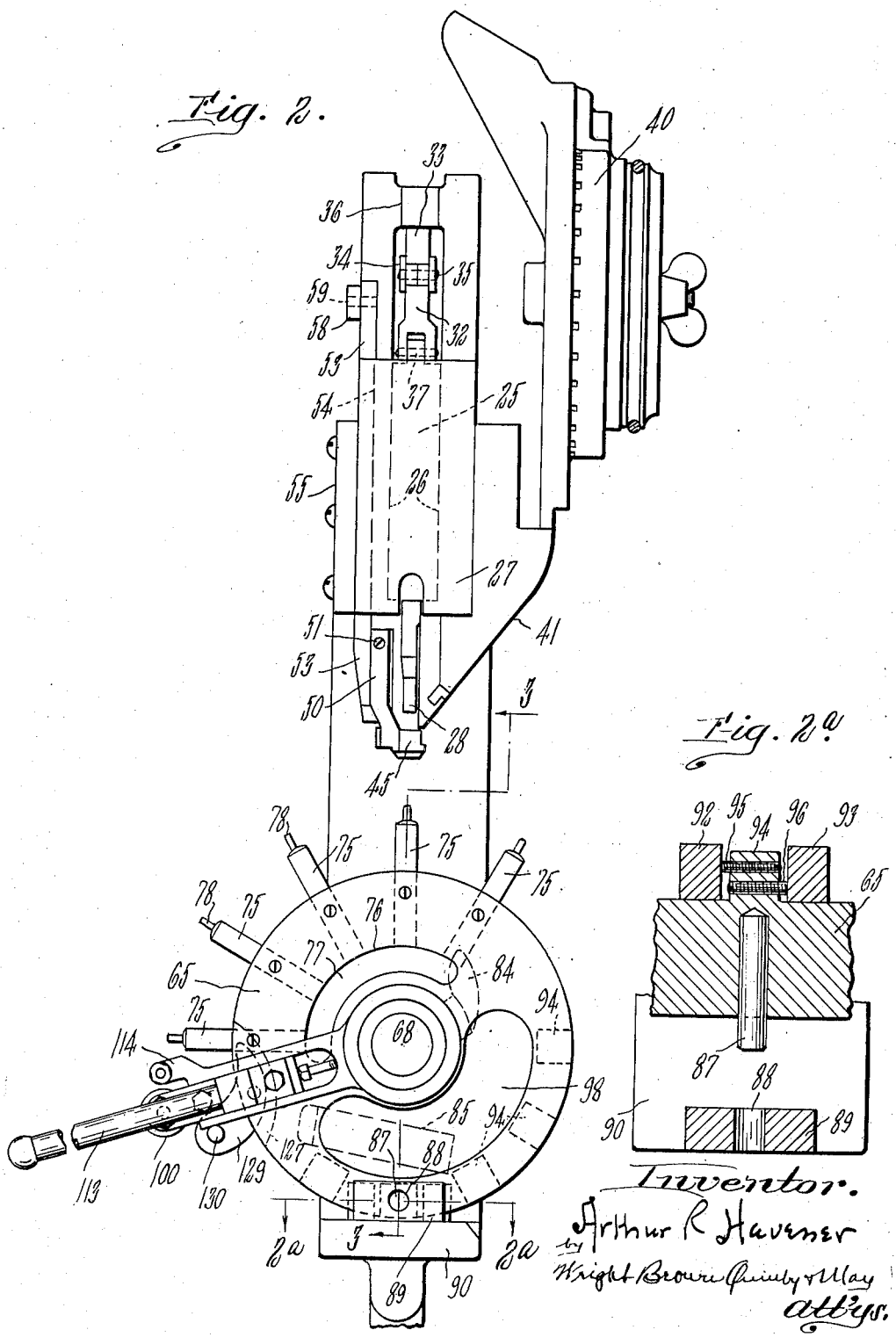
Figure 2 is a partial front elevation thereof on an enlarged scale, with the work support shown in position to be loaded with a brake band.

In the drawings, referring to Figures 1 and 2 particularly, the frame of the machine comprises a standard 10 mounted on a base 11 and having a head 12 fastened to the top of the standard. The head is preferably in the form of an overhanging arm upon which is mounted the rivet-driving means and the operating means therefor. A driving shaft 13 is rotatably mounted in a suitable bearing 14 carried by a bracket 15 fastened to the head 12 by bolts 16. To one end of the shaft is fastened a pulley 17 adapted to be driven by a belt 18 from a motor 19 mounted on a projecting shelf portion 20 of the frame. The shaft carries on its other end a pinion 21 meshing with a gear 22 fastened to a shaft 23 rotatable in a bearing 24 on the bracket 15.

Mounted in the end of the arm 12 for vertical reciprocation is a plunger or slide 25 (Figure 2) which is adapted to slide in ways 26 formed in the end of the arm and is held therein by a face plate 27. In the lower end of the plunger is mounted a pair of rivet drivers 28, one of which is shown in Figure 2, the other being directly behind the one shown. A vertical reciprocatory motion is imparted to the plunger and drivers by a pair of toggle links 32 and 33 and a connecting rod 34 connected together by a pivotal pin 35. The toggle link 33 is pivoted at 36 to the end of the arm 12 and the toggle link 32 is connected to the upper end of the plunger 25 by the pin 37. The connecting rod 34 is pivotally connected at its other end to a crank pin fastened in a cam plate, which, in turn, is fastened to the shaft 13, but these members are not shown. Through this mechanism, the rotation of the driving shaft imparts a reciprocatory motion to the plunger and the drivers.

Rivets of the well known tubular type are fed from a hopper 40, operated in a well known manner, down a raceway 41 and are separated by a rivet carrier slide 42 and are fed thereby alternately into rivet holders 45 and 46 (Figure 1) through secondary raceways 47 and 48 respectively. Any suitable hopper and carrier slide may be used for this purpose, and one such is shown in United States Letters Patent No. 1,733,713, issued to W. E. Bartel on October 29, 1929, to which reference may be made. Each of the holders 45 and 46 consists of two members fastened to springs 50, one of which is shown in Figure 2, which springs are fastened by screws 51 to a carrier slide 53 mounted in suitable ways 54 in the head 12 and locked therein by a side plate 55. This slide 53 is reciprocated vertically at the proper time to carry the rivet holders down close to the work through a lever 58, the end of which is pivotally fastened to the upper end of the slide by a pin 59, which lever is actuated by the cam hereinbefore mentioned, but not shown as it is well known in the art.

For a more particular description of the riveting machine itself, reference may be made to the Rhodes patent hereinbefore referred to, since the only change made in the machine of that patent is that two rivet drivers and holders are provided in place of one, and the hopper, raceway and slide mechanism of the Bartel patent are substituted for those parts shown in the Rhodes patent in order to adapt the machine for setting two rivets simultaneously.

Preferably, the work support of my invention is in the form of a circular block or turret 65 having a bored hub 66 permitting it to be mounted loosely on the free end of a horizontal shaft 68 and to be rotated or rocked in either direction in a vertical plane. The other end of the shaft is fixed in a horizontal arm 69 which is fastened to the head of the standard 10 underneath and in alinement with the overhanging head 12 of the frame (Figures 1 and 3) by bolts 70 mounted in vertical slots 71 in the arm. The slots permit of a limited vertical adjustment of the arm which may be held in adjusted position by a set screw 72 threaded through a lug 73 on the standard 10 and locked by a nut 74.

Figure 3:
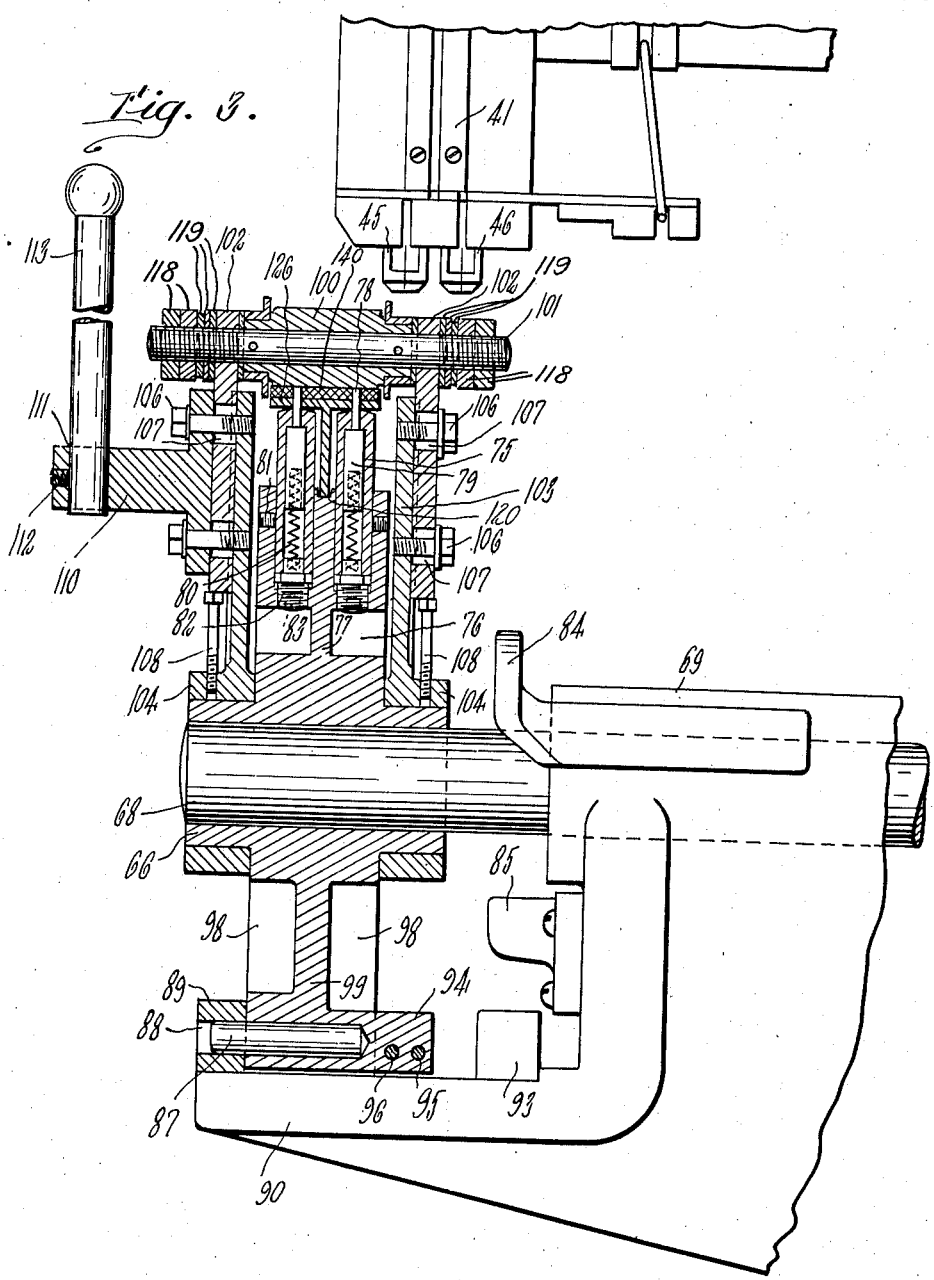
Figure 3 is a central, vertical, sectional view on a much larger scale, of the work support on line 3—3 in Figure 2, with the parts of the riveting machine shown in side elevation, this view showing a brake band in supported position with a lining applied thereto.

In an upper segment of its peripheral face, the turret is provided with a plurality of projecting anvils 75 mounted in radial bores which, at their inner ends, open into a pair of arcuate recesses 76 formed in the opposite faces of the turret and separated from each other by a central web 77 (Figure 3). Each anvil is in the form of a cylinder closed at its outer end to form a clenching surface with a small central opening through which normally projects a pilot 78 formed on a plug 79 loosely mounted within the anvil and backed up by a light helical spring 80. The spring normally holds the pilot in outward position but permits it to be retracted under a slight pressure. The plug may be provided with a bore for receiving the outer end of the spring, thus permitting a longer and more sensitive spring to be used. The cylinder is held in adjusted position in its respective bore by a set screw 81 in the side face of the turret and by a plug 82 threaded into the inner end of the bore. The head of the plug 82 may be provided with a square cavity 83 for receiving a proper tool for adjusting it.

These anvils may vary in number and arrangement, dependent upon the character of the work to be done; but in the present instance, where the work consists in fastening linings to brake bands, the anvils are preferably arranged in five equally spaced apart transverse pairs, and they project a distance sufficient for supporting a brake band on the rim of the turret.

For locking the turret in loading and various riveting positions, it may be provided with any suitable means adapted to interlock with means carried by the arm 69. In loading position, the turret is moved outwardly from under the riveting mechanisms to the end of the shaft 68 so that the said mechanisms will not interfere with placing work on the turret or removing it therefrom. For locking it in this position, the turret, in what is, in loading position, the lower segment of its front face, is provided with a projecting pin 87 adapted to engage a bore 88 in a block 89 fastened to the top face of a lower extended portion 90 of the arm 69 (Figure 3).

For locking the turret in various riveting positions, a pair of blocks 92 and 93 are fastened in spaced relation on the top face of the extension 90 (Figures 2a and 3) and the turret is provided on the lower marginal segment of its inner face with a plurality of square projections 94, each of which, when projected in between the said two blocks, locks the turret in a particular riveting position. Each of the projections is positioned diametrically opposite one of said pairs of anvils, and the projections correspond in number to the number of pairs of anvils, so that there is a projection for centering each pair of anvils in riveting position. To secure a more accurate centering, each projection 94 is somewhat narrower than the space between the blocks 92 and 93, and a pair of pins 95 and 96 is threaded transversely through each projection. The two pins 95 of each pair are so adjusted in offset relation to each other that pin 95 engages the block 92 and the other pin 96, the block 93, as shown in Figure 2a.

In centering the turret in a riveting position during the operation of the machine, it is moved longitudinally on the shaft 68 to insert loosely the end of a projection 94 and pin 95 in between the blocks 92 and 93, then the turret is turned slightly to cause the end of the pin 95 to engage tightly the block 92, after which the remaining portion of the projection and pin 96 may be forced into said space to lock the turret tightly against rotation. To reduce the weight of the turret and to better balance it, the lower portions of its opposite faces may be provided with arcuate recesses 98 separated by a web 99. For stretching the lining onto the brake band after one end of it has been fastened to the band, I provide means adapted to roll the lining under pressure and, preferably, under a dragging pressure, to compress and to stretch it uniformly. One form of this means comprises a metal roller 100 (Figure 3) secured to a shaft 101 fastened in and between the upper ends of a pair of bars 102 fastened adjustably to a pair of bars 103, having their lower ends provided with collar portions 104 which are mounted on the hub portions 66 of the turret. Each bar 102 is fastened to its respective bar 103 by a pair of bolts 106 mounted in vertical slots 107 in the former bar and having their ends threaded into the latter bar. The slots permit the bar 102 to be adjusted vertically on the bar 103 and the two bars are held in tight engagement by the overlapping heads of the bolts. A set screw 108 threaded into the hub 104 for engaging the bottom end of each bar 102 serves as a means for securing uniform vertical adjustment of the two bars. The outer bar 103 is provided with a bracket 110 which may be secured thereto by the bolts 106 and it is provided with an opening 111 in which may be fixed as by a set screw 112 a bar 113 of sufficient length so that by grasping the outer portion of this bar and pulling thereon the friction roller 100 may be moved between the angular positions shown in Figures 4 and 9 or to any intermediate position as desired. The bars 102 may be held in proper spaced relation independently of the roll 100, and for this purpose they are shown as provided with laterally offset ears 114 between which is positioned a spacer bar 115 (see Figure 7) to which the ears 114 may be secured as by means of the screws 116. The peripheral surface of the roller 100 is preferably knurled or otherwise roughened as shown in Figure 10 so as to present a frictional gripping face to the brake lining, and it may be frictionally held against turning so as to impart a dragging pressure on the brake lining when it is moved thereover, as by tightening nuts 118 threaded on the outer ends of the shaft 101 and bearing on friction washers 119 outwardly of the supporting bars 102.

As shown best in Figure 3, the turret 65 is provided with a central peripheral recess 120 throughout a portion only of its circumference, into which may be inserted the inner edge of a brake band 125 which as shown is of T cross section, the flanges 126 of the T overlying the anvils 75 and being provided with properly spaced holes to receive the pilots 78 therethrough. One end of the band 125 overlies a recess 127 which is a deepening of the recess 120 at one end, and between the sides of this recess 127 there is fulcrumed on the pin 128 an ejector finger 129 (see particularly Figure 10). This ejector finger 129 is provided near its outer end with a transverse pin 130 which extends outwardly therefrom to such an extent as to lie within the path of motion of the bars 102 when they are swung to the position of Figure 8, and on further motion counterclockwise to the position shown in Figure 9 the ejector finger 129 is rocked to bring its inner extremity 135 outwardly into contact with the flange of the brake band and to dislodge it from the groove 120, thus to facilitate the removal of the band together with the lining which has been riveted thereto at the completion of the riveting operation.

The operation of the machine is as follows. In Figures 1 and 2, the machine is shown in starting position, with the work support in position to be loaded with a brake band with the pin 87 locked in the block 89, the roll 100 being turned downwardly out of the way. In this position, the work support is forward out of alinement with the driving means and close to the operator, so that an unlined brake band may be mounted on the work support in the groove 120 and may then be pressed downwardly upon the anvils, with the pilots projecting through the bored holes in the brake band. After a brake band has been placed in position, the roll is then turned around over the brake band and beyond the opposite end of pair of anvils into the relative position shown in Figure 4, the pilots 78 yielding as the roll engages and passes thereover. The work support is pushed rearwardly sufficiently to withdraw the pin 87 from the hole 88 to unlock it from the block 89 and it is rotated to the left to bring the first anvils into alinement with the rivet-driving means, as seen in Figure 4, in which position it is pushed rearwardly and locked by the locking means comprising the screws 95 and 96 carried by one of the projections 94 engaging between the blocks 92 and 93 and with the turret back against the stops 84 and 85.

In that position, the lining 140 is laid on top of the band with one end adjusted upon the pair of pilots 78 at one end of the brake band (Fig. 4). The machine is then started to set a pair of rivets for fastening the end of the lining to the brake band. In this operation, the depression of the treadle sets the machine in action and the pair of drivers descends into engagement with the head of the rivets in the holders, after which the holders and drivers move downwardly in unison until the holders reach their lowest point, when the continued movement of the drivers forces the rivets out of the holders and through the work, clenching their bottom ends upon the clenching surfaces of the anvils, thereby fastening one end of the lining to the band.

The lining is then ready to be rolled onto the brake band, and to accomplish this, the bar 113 is grasped and turned, forcing the roller over and along the length of the lining into the position shown in Figure 5. In this operation, the roller is generally so adjusted in its distance from the shaft 68 and in the frictional resistance to its rotation imparted by the friction washers 119 as to compress the lining and also to exert a dragging action upon the lining, in order to stretch it so that the punched holes in the lining will be stretched into register with the pilots in the series of anvils.

The work support is then pulled forwardly on the shaft to disengage the previously engaged projection 94 from the locking means 92, 93 which held it in the position shown in Figures 4 and 5 and the work support and roll are rotated to the right to bring the pair of anvils at the unrivetted end of the brake band into alinement with the drivers, and said work support is pushed back and locked in that position by the locking means, as shown in Figure 6. The machine is then operated to set a pair of rivets for fastening the free end of the lining to the brake band, after which the work support may, in succession, be pulled forwardly, turned and pushed rearwardly and locked in proper position for setting the rivets in the intermediate holes in the lining and band. After the two ends of the lining have been fastened to the band, the roll may then be turned to the left into the position shown in Figure 8 and out of engagement with the lining and band and when the riveting is entirely completed it is turned further to the position of Figure 9 which turning causes the sides 102 and 103 to move the pin 130, causing the ejector 129 to pivot about the pin 128 and press upon the brake band with the result that one end of the band is ejected so that the band with the lining can be removed. In the relationship shown in Figure 8 the pin 87 is opposite to the hole 88 in the block 89. To remove the lined band, the turret 65 is pulled forwardly causing the pin 87 to enter the hole 88 thus to retain the turret against turning. After ejection of the end of the band and before removal thereof, the roller is moved back to the position of Figures 8 and 2. This frees the ejector from any interference from the arms 102 and 103 and the parts of the machine are thus re-established in the relationship of Figure 2 for a new operative cycle.

From the foregoing description of an embodiment of this invention, it should be evident to those skilled in the art that various changes and modifications might be made without departing from the spirit or scope of the invention as defined by the appended claims.

I claim:

1. In a machine of the class described, the combination with means for operating on work, of a work support rotatably mounted for presenting in succession different portions of the work on said support to said operating means and axially movable into and out of operative relation to said operating means, and means acting when said support is moved axially into said operative relation to retain said support against rotation and in position to present a selected one of said work portions to said operating means and to free said support for rotation when said support is moved axially out of operative relation to said operating means.

2. In a machine of the class described, a machine frame, means carried by said frame for operating on work, a work support mounted for rotation and axial motion, said support in one axial position being related to said operating means for said operating means to perform an operation on work carried by said work support, and means for retaining said support in any selected one of a plurality of angular positions when in said axial position, said retaining means comprising a pair of lugs on said frame and a lug on said work support positioned between said frame lugs when said support is in said axial position and removable from between said frame lugs to permit rotation of said work support on axial motion of said work support from said one position.

3. In a machine of the class described, a machine frame, means carried by said frame for operating on work, a work support mounted for rotation and axial motion, said support in one axial position being related to said operating means for said operating means to perform an operation on work carried by said work support, and means for retaining said support in any selected one of a plurality of angular positions when in said axial position, said retaining means comprising a pair of lugs on said frame and a lug on said work support positioned between said frame lugs when said support is in said axial position and removable from between said frame lugs to permit rotation of said work support on axial motion of said work support from said one position, said work support lug being narrower than the space between said frame lugs and having pins projecting from opposite sides thereof spaced axially of said work support for simultaneous engagement with said frame lugs when said support is in said one position.

4. In a riveting machine, the combination with rivet driving means, of a work support having a periphery adapted for supporting a brake band, said work support being rotatably mounted for presenting different portions of said band to said driving means, means for locking said work support in each of its various positions of rotation, a roller, and means for actuating said roller to roll a lining onto said band after it has been fastened at one end to one end of said band.

5. In a riveting machine, the combination with rivet driving means, of a work support having a periphery adapted for supporting a brake band, said work support being rotatably mounted for presenting different portions of said band to said driving means, means for locking said work support in each of its various positions of rotation, a roller, and means for moving said roller under a dragging pressure along a brake lining on said band after said lining has been fastened at one end to one end of said band.

6. In a riveting machine, the combination with rivet driving means, of a work support having a periphery adapted for supporting a brake band, said work support being rotatably mounted for presenting different portions of said band to said driving means, means for locking said work support in each of its various positions of rotation, a brake lining engaging member, and means for actuating said member to stretch a brake lining onto said band after said lining has been fastened at one portion thereof to a corresponding portion of said band.

7. In a riveting machine, the combination with rivet driving means, of a work support having a periphery adapted for supporting a brake band, said work support being rotatably mounted for presenting different portions of said band to said driving means, means for locking said work support in each of its various positions of rotation, a brake lining engaging member mounted for rocking motion about the rotational axis of said work support, and means for effecting such rocking motion while said member engages said lining to stretch said lining against the face of said band.

8. In a riveting machine, the combination of a work-supporting turret carrying a plurality of equally spaced pairs of radial anvils adapted for supporting a brake band in riveting position, means for locking said turret in riveting position for each of said pairs of anvils, and means for progressively rolling and pressing onto said brake band a brake lining which is fastened at one end to said band to press it closely to said band and to hold it in that position while it is being fastened at its other end to said band.

9. In a machine of the class described, rivet-driving means, means for supporting an arcuate brake band for successive presentation of different portions thereof to said rivet-driving means, anvils carried by said supporting means and provided with retractible pilots on which said brake band and a lining therefor may be impaled for presentation selectively to said driving means, and means mounted for progressive engagement with the lining lengthwise thereof for stretching and impaling said lining on said anvils and conforming it to said band in advance of the driving of the rivets.

10. In a machine of the class described, rivet-driving means, a turret mounted for rocking motion about an axis for presenting different portions of its periphery into cooperative relation to said driving means, said turret having means for supporting a brake band, a plurality of anvils carried by said turret for selective cooperation with said driving means and having retractible pilots on which said band and a lining therefor may be impaled, a roller, means supporting said roller for rocking about said axis in position to conform a brake lining to said band as said roller is rocked about said axis, and means frictionally holding said roller against rotation about its own axis.

11. In a machine of the class described, rivet-driving means, a turret mounted for rocking motion about an axis for presenting different portions of its periphery into cooperative relation to said driving means, said turret having means for supporting a brake band, a plurality of anvils carried by said turret for selective cooperation with said driving means and having retractible pilots on which said band and a lining therefor may be impaled, a roller, means supporting said roller for rocking about said axis in position to conform a brake lining to said band as said roller is rocked about said axis, and an ejector finger engageable beneath one end of said band and engageable by said roller when said roller is rocked beyond said band end to force said band end away from said turret.

ARTHUR R. HAVENER.